United States Patent
Pattem et al.

(10) Patent No.: US 12,344,560 B2
(45) Date of Patent: Jul. 1, 2025

(54) ARMOR COMPONENT COMPRISING A TITANIUM CARBONITRIDE PHASE

(71) Applicants: SAINT-GOBAIN CENTRE DE RECHERCHES ET D'ETUDES EUROPEEN, Courbevoie (FR); Hemanth Kumar Pattem, Andhra Pradesh (IN)

(72) Inventors: Hemanth Kumar Pattem, Andhra Pradesh (IN); Nandi Subhasis, Karnataka (IN); Ghosh Bismit, Karnataka (IN); Matthieu Graveleau, Avignon (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 763 days.

(21) Appl. No.: 17/641,501

(22) PCT Filed: Sep. 10, 2020

(86) PCT No.: PCT/IN2020/050785
§ 371 (c)(1),
(2) Date: Mar. 9, 2022

(87) PCT Pub. No.: WO2021/048875
PCT Pub. Date: Mar. 18, 2021

(65) Prior Publication Data
US 2022/0306545 A1      Sep. 29, 2022

(30) Foreign Application Priority Data

Sep. 13, 2019 (IN) ............................. 201941036940
Nov. 15, 2019 (FR) ........................................ 1912751

(51) Int. Cl.
C04B 35/10      (2006.01)
C04B 35/565     (2006.01)
(Continued)

(52) U.S. Cl.
CPC ........ *C04B 35/58021* (2013.01); *C04B 35/10* (2013.01); *C04B 35/565* (2013.01); *C04B 35/597* (2013.01)

(58) Field of Classification Search
CPC .... C04B 2235/3229; C04B 2235/3232; C04B 2235/3272; C04B 2235/3821;
(Continued)

(56) References Cited

U.S. PATENT DOCUMENTS 3,509,833 A    5/1970  Cook
3,516,898 A    6/1970  Cook
(Continued)

FOREIGN PATENT DOCUMENTS

WO    WO 2014/096846 A1    6/2014
WO    WO 2018/011477 A1    1/2018

OTHER PUBLICATIONS

KR International Search Report as issued in International Patent Application No. PCT/IN2020/050785, dated Dec. 9, 2020.

*Primary Examiner* — Lawrence D Ferguson
(74) *Attorney, Agent, or Firm* — Pillsbury Winthrop Shaw Pittman LLP

(57) ABSTRACT

An armor component and manufacturing thereof which includes a ceramic hard material, where the hard material has a bulk density that is lower than 3.5 g/cm³ and includes grains of ceramic material having a Vickers hardness that is higher than 15 GPa, bonded by an bonding matrix, the bonding matrix representing between 20 and 80% by weight of the constituent hard material of the ceramic body, and
(Continued)

including alumina, silicon nitride and $TiC_xN_{1-x}$ crystalline phases, wherein x is included between 0 and 1.

21 Claims, 1 Drawing Sheet

(51) Int. Cl.
*C04B 35/58* (2006.01)
*C04B 35/597* (2006.01)

(58) Field of Classification Search
CPC .... C04B 2235/3856; C04B 2235/3869; C04B 2235/3886; C04B 2235/428; C04B 2235/5436; C04B 2235/5445; C04B 2235/5463; C04B 2235/5472; C04B 2235/6027; C04B 2235/6567; C04B 2235/658; C04B 2235/77; C04B 2235/78; C04B 2235/80; C04B 2235/85; C04B 2235/94; C04B 2235/96; C04B 35/10; C04B 35/565; C04B 35/58021; C04B 35/597; C04B 35/64; F41H 5/0414
See application file for complete search history.

(56) References Cited

U.S. PATENT DOCUMENTS

| | | |
|---|---|---|
| 2009/0156384 A1 | 6/2009 | Liebald et al. |
| 2017/0241747 A1 | 8/2017 | Ganor |

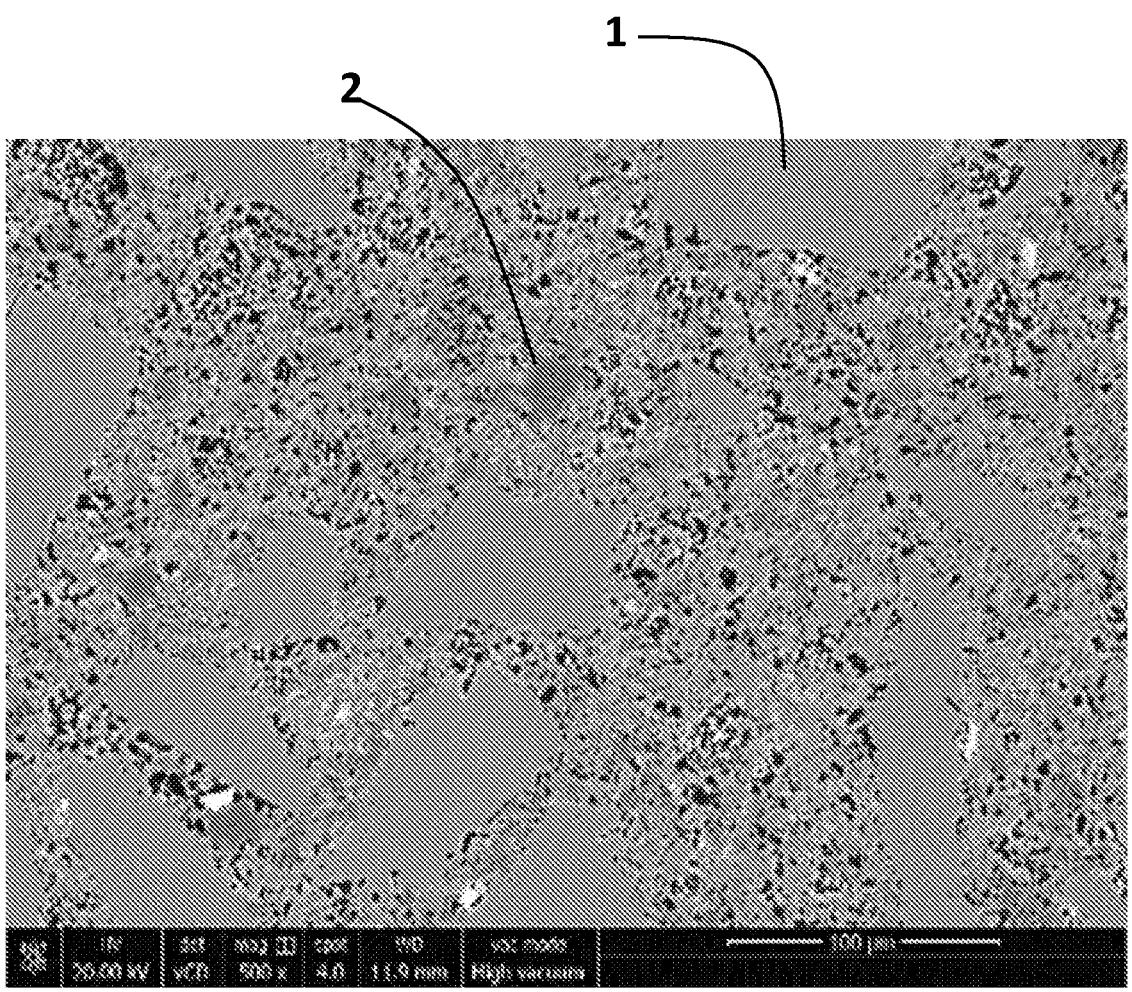

ARMOR COMPONENT COMPRISING A TITANIUM CARBONITRIDE PHASE

CROSS-REFERENCE TO RELATED APPLICATIONS

This application is the U.S. National Stage of PCT/IN2020/050785, filed Sep. 10, 2020, which in turn claims priority to Indian patent application number 201941036940 filed Sep. 13, 2019 and French patent application number 1912751 filed Nov. 15, 2019. The content of these applications are incorporated herein by reference in their entireties

FIELD OF THE INVENTION

The present invention relates to the field of armor components, and in particular related to armor components comprising silicon carbide-based ceramic and more particularly related to nitride-bonded SiC composite.

BACKGROUND

Armor and other protective materials are usually formed from a series of components, each comprising a plurality of layers of one or more different materials. Such a composite is for example described in U.S. Pat. Nos. 3,509,833 and 3,516,898.

Such materials, such as ceramics, are typically used for their preferential mechanical characteristics, such as, for example, hardness and density. Materials such as, for example, silicon carbide, boron carbide, alumina, alumina zirconia or alumina spinal have been previously used in body armor plates.

One of the advantages of ceramic armor component over the prior art steel armor component is a much lower weight per unit of protective area. Ceramics find their use particularly in armor for which a low weight is necessary, for example in bullet-proof vests and in armor for vehicles, aircraft and helicopters for example.

Silicon carbide or boron carbide materials were found more interesting than alumina because of their lower specific gravity whereas the use of alumina is significantly less expensive for manufacturing armor plates.

Because dense ceramic plates are still produced by costly processes, several solutions have been proposed.

For example, US2009156384A1 describes an armor material made of glass ceramic which may comprise SiC fibres.

More recently nitride bonded SiC armors have been suggested. WO2014096846A1 describes for instance a SiAlON bonded SiC comprising rare earth as sintering aids. Rare earth material remains however expensive.

WO2018011477 (A1) discloses also an antiballistic armor plate including a ceramic body comprising grains made of hard material like SiC or $B_4C$ bonded with a matrix comprising nitride or oxynitride. The ceramic body has a specified porosity, a given residual Si content per thickness of ceramic body and a particular grains size distribution.

However, there is currently a need for armor components having a better ratio performance vs cost. In particular, nitride bonded ceramics may be improved in their structure characteristics to obtain better thermal and mechanical properties, as required for armor applications.

It has been identified through the experiments carried out by the applicant that it is possible to reach such a target with armors component shaped from a mixture comprising grains of ceramic materials such as silicon carbide and a specific additional content of aluminum and titanium oxides. The mixture is sintered under nitrogen atmosphere to obtain a high ballistic performance material by strong bonds between said grains via a bonding matrix issued from said additional compounds.

OBJECT OF THE INVENTION

The object of the present invention is to provide an armor component which is light weight, having a better ratio performance vs cost and excellent ballistic properties as required for armor applications.

Another object of the present invention is to provide a method for manufacturing the ceramic hard material, which is comprised in the armor component.

SUMMARY OF THE INVENTION

An aspect, of the instant invention provides an armor component comprising a ceramic hard material, wherein said ceramic material is characterized by, a bulk density lower than 3.5 g/cm³, comprising grains of ceramic material having a Vickers hardness higher than 15 GPa, comprising a bonding matrix which binds said grains. Said bonding matrix represents between 20 and 80% by weight of said material of the ceramic body. The bonding matrix comprises an alumina phase, a crystalline phase comprising silicon and nitrogen and a $TiC_xN_{1-x}$ crystalline phase, wherein x is comprised between 0 and 1.

In another aspect, the present invention provides a method for the manufacturing the ceramic hard material. The method comprises a) preparing a powdered batch of an admixture comprising: (i) an α-silicon carbide mixture at 50 to 80% by weight of said admixture (ii) a powder comprising metallic silicon in a proportion from 0 to 8% by weight of said admixture; (iii) an α-alumina powder preferably having an average particle size below 50 micrometers, in a proportion from 20 to 40% by weight of said admixture; (iv) a titanium oxide powder having an average particle size below 100 micrometers, in a proportion from 0.5 to 10% by weight of said admixture; b) mixing the powdered batch with a solvent, preferably water, and optionally shaping additives, like surfactant, dispersant, plasticizer, and shape to obtain a body having a green density of at least 2.5 after drying; and c) drying and reactive sintering the body under a nitrogenous atmosphere to form a ceramic tile.

The other features of the present invention will be described in detail in conjunction with the accompanying drawings and the specific embodiments, but not limit the present invention.

BRIEF DESCRIPTION OF THE DRAWINGS

The present invention can be better understood, and its numerous features and advantages made apparent to those skilled in the art by referencing the accompanying drawings.

The use of the same reference symbols in different drawings indicates similar or identical items.

FIG. 1 is a SEM image from a polished section of the ceramic hard material of example n° 2, according to an embodiment of the present invention.

Skilled artisans appreciate that elements in the drawings are illustrated for simplicity and clarity and have not necessarily been drawn to scale. For example, the dimensions of some of the elements in the FIGURES may be exaggerated relative to other elements to help to improve understanding of various embodiments of the disclosure.

DETAILED DESCRIPTION

The following description, in combination with the FIGURES, is provided to assist in understanding the teachings disclosed herein. The following discussion will focus on specific implementations and embodiments of the teachings. This discussion is provided to assist in describing the teachings and should not be interpreted as a limitation on the scope or applicability of the teachings.

Note that not all of the activities described in the general description or the examples are required, that a portion of a specific activity may not be required, and that one or more further activities may be performed in addition to those described. Still further, the order in which activities are listed is not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of systems that use the structures or methods described herein. Certain features, that are for clarity, described herein in the context of separate embodiments, may also be provided in combination in a single embodiment. Conversely, various features that are, for brevity, described in the context of a single embodiment, may also b e provided separately or in a sub combination. Further, reference to values stated in ranges includes each and every value within that range. It will further be understood that no limitation of the scope of the disclosure is thereby intended, such alterations and further modifications in the disclosed composition, system, product and method, and such further applications of the principles of the disclosure therein being contemplated as would normally occur to one skilled in the art to which the disclosure relates.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or.

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting. To the extent that certain details regarding specific materials and processing acts are not described, such details may include conventional approaches, which may be found in reference books and other sources within the manufacturing arts.

Reference throughout this specification to "one embodiment" "an embodiment" "some embodiments" "alternate embodiment" or similar language means that a particular feature, structure, or characteristic described in connection with the embodiment is included in at least one embodiment of the present disclosure.

Thus, appearances of such phrases throughout this specification may, but do not necessarily, all refer to the same embodiment.

The main aspect of the present invention is to provide an armor component comprising a ceramic hard material, wherein said ceramic material is characterized by, a bulk density lower than 3.5 g/cm$^3$. The armor component according to the present invention comprises grains of ceramic material having a Vickers hardness higher than 15 GPa, comprising a bonding matrix which binds said grains.

The bonding matrix according to the present invention represents between 20 and 80% by weight of said material of the ceramic body. The bonding matrix comprises an alumina phase, a crystalline phase comprising silicon and nitrogen and a $TiC_xN_{1-x}$ crystalline phase, wherein x is comprised between 0 and 1.

The ceramic material in accordance with the present invention is a hard material. Various embodiments and preferred embodiments of the present invention are described below, which embodiments can of course, where appropriate, can also be combined with one another.

The bonding matrix content in accordance with the present invention represents more than 25% by weight of said hard material, preferably more than 30% by weight and/or less than 55% by weight, preferably less than 50% by weight of said hard material.

The hard material in accordance with the present invention is preferably in a shape of a ceramic tile. In an embodiment the bulk density of the ceramic hard material is higher than 2.0 g/cm$^3$, preferably higher than 2.2 g/cm$^3$, more preferably higher than 2.5 g/cm$^3$.

The $TiC_xN_{1-x}$ crystalline phase content, as measured by X-Ray diffraction, represents more than 1% b/w of said hard material. In a preferred embodiment the $TiC_xN_{1-x}$ crystalline phase content is more than 2% b/w, more than 3% b/w, and/or less than 10%. In a most preferred embodiment $TiC_xN_{1-x}$, crystalline phase content is less than 5% b/w and more preferably less than 4% b/w of the sum of crystalline phases in said hard material:

x is higher than 0, preferably higher than 0.1, more preferably higher than 0.2.

x is lower than 1, preferably lower than 0.9.

More preferably, x is comprised between 0.2 and 0.8.

In accordance with the present invention the total content of $TiO_2$ of the hard material may be measured by X-Ray Fluorescence analysis. The $TiO_2$ content of the hard material in an embodiment is comprised between 0.5 and 12% by weight. The $TiO_2$ content of the hard material in a most preferred embodiment is more than 1% and/or less than 10% by weight.

Usually in the field of ceramics, the $TiO_2$ as measured by X-Ray Fluorescence analysis does not mean that the $TiO_2$ oxide form is present in the measured phase. By X-Ray Fluorescence analysis, a measure of the Ti content in said material can be done, irrespective of the crystalline or amorphous form wherein the Ti atoms are included. The Ti content in the material deduced from the $TiO_2$ measurement by X-Ray Fluorescence may be greater than the amount of Ti corresponding to the content of $TiC_xN_{1-x}$ crystalline phase measured by X-Ray diffraction on the hard material. This is because part of the titanium oxide added as reactant could be as an amorphous or glassy phase or as another crystalline phase (for example by combining with another oxide) in the final product.

In accordance with the present invention the total $Al_2O_3$ content of the hard material is measured in the same way, by X-Ray Fluorescence analysis. In an embodiment the $Al_2O_3$ content in the hard material is higher than 10%, preferably higher than 15%, more preferably higher than 20%, and/or lower than 50%; preferably lower than 40%, more preferably lower than 35% by weight of said hard material. Al element may be present in the under alumina phase, such as Corundum and/or another oxide phase, for example mullite phase; or under Silicon Aluminium Oxynitride (SiAlON) phase.

In accordance with the present invention, the alumina phase is alpha-alumina or corundum phase. Incorporation of alumina into the grain boundaries of SiC based composite improves the mechanical properties. Silicon carbide has low density and alumina is not expensive. Therefore, use of alumina and silicon carbide will reduce the density as well as the cost. In an embodiment the composite product's density is in the range of 2.80 to 2.88 gm/cc, i.e. less than the alumina product. Alumina has high hardness material, high elastic module and good flexural strength, thereby making excellent armor with great ballistic properties.

In accordance with the present invention the mass ratio between $Al_2O_3/TiO_2$ in the ceramic hard material, wherein $TiO_2$ and $Al_2O_3$ content are measured by X-Ray fluorescence, is more than 1, preferably more than 2, preferably more than 10, or even more than 20, and/or less than 40. In a most preferred embodiment the mass ratio between $Al_2O_3/TiO_2$ in the hard material is less than 35.

In an embodiment silicon and nitrogen crystalline phase comprises $Si_3N_4$ phase and/or silicon oxynitride crystalline phase. In particular silicon oxynitride phase may be $Si_2ON_2$ and/or Silicon Aluminium Oxynitride (SiAlON), more particularly -SiAlON phase. Preferably silicon and nitrogen crystalline phase represents more than 40% b/w of the bonding matrix. Preferably silicon and nitrogen crystalline phase consists essentially of Silicon Aluminium Oxynitride, corresponding substantially to the general formula $Si_xAl_yO_uN_v$, wherein x is greater than or equal to 0, greater than 0.05, greater than 0.1 or greater than 0.2, and less than or equal to 1, less than or equal to 0.8 or less than or equal to 0.4; y is greater than 0, or greater than 0.1, greater than 0.3 or greater than 0.5, and less than or equal to 1; u is greater than or equal to 0, greater than 0.1 or greater than 0.2, and less than or equal to 1 or less than or equal to 0.7; and v is greater than 0, greater than 0.1, greater than 0.2 or greater than 0.5, or greater than 0.7, and less than or equal to 1.

The crystallized SiAlON phase in accordance with the present invention is preferably β'SiAlON phase which can still be expressed with the formula $Si_{6-z}Al_zO_zN_{8-z}$ in which the index z is a stoichiometric index such that 0<z<4.2. In a preferred embodiment, z is greater than 1, or even greater than 2 and/or less than 4, or even less than 3.5.

In an embodiment Silicon Aluminium Oxynitride (SiAlON) content of the hard material is less than 10% by weight of said hard material. Silicon nitride (generally with substantially with $Si_3N_4$ formula) content of said hard material is less than 5% by weight of said hard material.

The SiAlON content of said hard material is more than 15%, preferably more than 20% and/or less than 40%, preferably less than 35% by weight of said hard material.

The bonding matrix in accordance with the present invention does not comprise phases like $Si_3N_4$ or $Si_2ON_2$ crystalline phases.

In an embodiment the content of Corundum phase (or alpha $Al_2O_3$ phase) measured by X-Ray diffraction of the hard material is more than 10% b/w preferably more than 20% b/w, and/or less than 50%, preferably less than 40% b/w of the hard material.

In an embodiment the mass ratio $TiO_2$/silicon and nitrogen crystalline phase, wherein $TiO_2$ content is measured by X-Ray fluorescence and the content of silicon and nitrogen crystalline phase measured by X-Ray diffraction, is more than 0.05, preferably more than 0.1 and/or less than 1, preferably less than 0.8.

Silicon oxide may be present under oxynitride phase, $SiO_2$ crystalline or amorphous phase due to possible oxidation of the SiC grains during the firing or sintering step of the ceramic tile. Preferably, $SiO_2$ content present under $SiO_2$ phase (or in other words not present under oxynitride crystalline phase) is very limited, preferably less than 3% by weight, preferably less than 1% by weight, of ceramic hard material.

$Fe_2O_3$ content of said ceramic hard material is more 0.05, preferably more than 0.1 and/or less than 2%, preferably less than 1.5% by weight. CaO and/or MgO and/or SrO and/or BaO and/or $ZrO_2$ and/or rare earth oxide content of said hard material is below 0.5% by weight and the sum of the all those oxide is less than 2% by weight.

As a reminder rare-earth elements are cerium(Ce), dysprosium(Dy), erbium(Er), europium(Eu), gadolinium(Gd), holmium(Ho), lanthanum(La), lutetium(Lu), neodymium (Nd), praseodymium(Pr), promethium(Pm), samarium(Sm), scandium(Sc), terbium(Tb), thulium(Tm), ytterbium(Yb) and yttrium (Y).

The content of Boron and/or $Na_2O$ and/or $K_2O$ content is not more than 0.5% by weight of said hard material. Such a bond matrix formulation gives the best compromise versus ballistic properties and sinterability or feasibility considerations. The binding matrix in accordance with the present invention is sparingly porous. Its porosity is less than 15%, preferably less than 12% or even 10% by volume. The porosity of the matrix is determined according to the following formula:

$$\text{porosity}_{binding\ matrix} = \text{porosity}_{material} \times \frac{\text{volume}_{material}}{\text{volume}_{binding\ matrix}}$$

The porosity, corresponding to the volume of closed and open pores multiplied by 100 and divided by the volume of material, is calculated according to the ratio, expressed as a percentage, of the bulk density measured according to ISO 18754 to the absolute density measured according to ISO 5018.

The volume of binding matrix is the volume of material minus the total pore volume and the grain volume. The grain volume is determined by analysis of images taken with a scanning microscope. One example of determination of the grain volume, by way of illustration, comprises the succession of the following steps, which are conventional in the field:

A series of SEM images is taken on polished slices or sections of the material. The image acquisition is performed on a cumulative surface area at least equal to 5 cm² of material, so as to obtain representative values of the grain volume.

The images are preferably subjected to binarization techniques, which are well known in image processing techniques, for increasing the contrast of the grain contour.

For each grain, a measurement of its area is performed. This operation can optionally be performed using dedicated software, notably Visilog® sold by Noesis. The sum of the areas of all the grains of an image thus measured relative to the surface area of the image defines the ratio between the grain volume and the volume of material.

The average on a minimum of 10 images makes it possible to obtain a precise and representative measurement of the ratio of the grain volume to the volume of material. The binding matrix has a Vickers hardness of greater than 7 GPa, preferably greater than 8 or even 10 GPa. The hardness of the matrix is measured according to ASTM C1327. Preferably, the imprint is of a size adapted to the representative volume of the binding phase, namely an imprint of greater than 10 µm.

Preferably, the hardness is calculated on the average of five indentations performed so as to obtain a result representative of the matrix. Preferably, no indentation leads to an individual measurement of less than 6 GPa.

The grains of ceramic material in accordance with the present invention have a Vickers hardness measured according to ASTM C1327 is higher than 15 GPa are preferably made of silicon carbide, more preferably α-silicon carbide (α-SiC) of crystalline SiC. In an alternate embodiment, the ceramic grains having a Vickers hardness of greater than 15 GPa may comprise of boron carbide. In a most preferred embodiment, the grains comprise essentially of $B_4C$.

The purity of the SiC grains is at least 95% by weight(b/w). The SiC content, in a preferred embodiment as measured by LECO method, is higher than 40%, preferably higher than 45% of ceramic said hard material. In a further preferred embodiment, the SiC content, as measured by LECO method, is lower than 70%, preferably lower than 60% by weight of said hard material.

The mean ceramic grain size of grains having a Vickers hardness higher than 15 GPa are distributed according to two different fractions whose size ranges are: 10 to 400 micrometers and
i) 0.1 to 40 micrometers.
More preferably,
i) 15 to 370 micrometers and
ii) 0.5 to 30 micrometers.
More preferably, the mean grain sizes comprise:
i) 20 to 200 micrometers and
ii) 0.1 to 15 micrometers.

The present grain size distribution of the silicon carbide in accordance with the present invention is advantageous to promote the formation of a strong green body and high green density. This range is specified because of the addition of aluminium and titanium oxides present in the mixture.

In accordance with the present invention the armor including an armor component according to the invention preferably comprises on the inner face of said ceramic hard material, generally shaped as a tile, a back energy-dissipating coating, said assembly ceramic hard material/back energy-dissipating coating being optionally surrounded by a protective envelope.

In an embodiment the back coating comprises essentially a material chosen from the polyethenes PE, in particular ultra-high-molecular-weight polyethenes (UHMPEs), glass or carbon fibres, aramids, metals such as aluminium, titanium or their alloys, or steel.

In an embodiment the ceramic body-back coating assembly is surrounded by an envelope of a confining material. The constituent material of the envelope in accordance with the present invention is chosen from the polyethenes PE, in particular ultra-high-molecular-weight polyethenes (UHMPEs), glass or carbon fibers, aramids, metals such as aluminium or steel.

The ceramic product in accordance with the present invention, is preferably shaped as a tile, comprising of the ceramic hard material according to the invention may present one or more of the following characteristics:
the front face opposite to the inner face of the ceramic product is larger than 150 $cm^2$,
the thickness, defined by the minimal distance between the front face and the inner face of the ceramic product, is greater than 10 mm,
the open porosity of the ceramic product is higher than 5%, preferably higher than 8%, higher than 10% and/or lower than 15% in volume, preferably lower than 13%, more preferably lower than 12%;
alumina and titanium phase, preferably titanium oxide ($TiO_2$) and Corundum (α-Alumina) are evenly distributed within the bonding matrix, as visualized by employing for example an SEM-EDEX equipment.

According to another aspect of the present invention there is provided a method for the manufacturing the ceramic material. The method comprises the steps of a) preparing a powdered batch of an admixture comprising:
50 to 80% by weight of a α-silicon carbide mixture, said admixture comprising two fractions with at least two mean grain sizes including
i) 0.1 to 15 micrometers, representing 50 to 75% by weight of the total SiC addition, and
ii) 20 to 200 micrometers, representing 25 to 50% by weight of the total SiC addition;
0 to 8% by weight of a powder comprising metallic silicon at;
20 to 40% by weight of an α-alumina powder preferably having an average particle size below 50 micrometers, preferably below 30 micrometers;
0.5 to 10% by weight, preferably 1 to 8%, by weight of a titanium oxide powder having an average particle size below 100 micrometers;
b) mixing the powdered batch with a solvent, preferably water, and optionally shaping additives, like surfactant, dispersant, plasticizer, and shape to obtain a body having a green density of at least 2.5 after drying;
c) drying and reactive sintering the body under a nitrogenous atmosphere to form a ceramic tile.

A ceramic component, for example a tile, according to the current invention, comprises:
40 to 70% by weight of a α-silicon carbide phase, said phase having preferably at least two mean grain sizes of i) 20 to 200 micrometers and ii) less than 20 micrometers;
30% to 60% by weight of a bonding matrix at least partially surrounding said α-silicon carbide grains, said bonding matrix comprising at least a crystalline alumina phase, such as corundum or α-alumina, a crystalline nitride phase comprising at least Si and N elements more preferably a SiAlON phase; and a crystalline phase $TiC_xN_{1-x}$ wherein x is comprised between 0 and 1.

In an embodiment, the method for manufacturing the ceramic material may present one or more of the below characteristics:

The average particle size or D50 of the alumina powder is below 20 micrometres. In a preferred embodiment the powder containing more than 95% $Al_2O_3$ is added. In a further preferred embodiment, 20 to 35% of such a powder is added.

In accordance with the present invention the powder comprising Si consists essentially of metallic Silicon. Addition of Si is preferable even if some SiC fines of the grains admixture may be converted to silicon and nitrogen crystalline phase. Preferably 0.5 to 5% of metallic Silicon is added. In a further preferred embodiment the metallic Si added to the mix represents preferably more than 1%, preferably 2% or more of the weight of the admixture at step a).

In accordance with the present invention the average particle size of the titanium oxide powder is below 70 micrometers, preferably below 50 micrometres to increase reactivity during firing. In a further preferred embodiment, a powder containing more than 95% $TiO_2$ is added. Preferably 5 to 7% of such a powder is added.

The process of shaping is chosen within the group slip casting, pressure casting, cold or dry pressing, hot pressing, or even extrusion, preferably slip casting. The drying step under air at a temperature higher than 80° C. and below 300° C.

Further, in accordance with the present invention the reactive sintering is performed under nitrogen at a temperature between 1300 and 1600° C. In a preferred embodiment between 1350 and 1500° C.

Definitions

The following designations and definitions are given, in connection with the preceding description of the present invention:

A hard material is understood to mean a material that is sufficiently hard to justify its use in armor or shield elements.

Bonding matrix means a crystalline or non-crystalline composite material, comprising a sum of crystalline phases, which provides a substantially continuous structure between the grains and which is obtained, during sintering, from the constituents of the starting feedstock and from the constituents of the gaseous environment of this starting feedstock, notably nitrogen. A bonding matrix generally substantially surrounds the grains of the granular fraction, i.e. this bonding matrix coats them.

In a ceramic hard material or component according to the invention, the ceramic grains of said hard material or component are bound by the matrix. During sintering, the grains substantially retain the shape, size and the chemical properties that they had in the starting feedstock. In the hard material, the matrix or bonding matrix and the grains together represent 100% of the mass of the material. Such a matrix obtained by reactive sintering exhibits distinctive features. In particular, during reactive sintering, the precursor metals of the nitrogen-containing crystalline phases or for example even the SiC fines are nitrided. Oxides of the mixture, like titanium oxide, may be completely or at least partially carburized and/nitrided. The residual oxide remaining under oxide alone or combined with other oxides present within the mixture, in a glassy or amorphous phase or under crystalline phase.

The resulting increase in volume, typically from 1 to 30%, advantageously makes it possible to fill in the pores of the matrix and/or to compensate for the shrinkage caused by sintering the grains. Reactive sintering thus allows the mechanical strength of the sintered product to be improved. Reactively sintered products thus exhibit a significantly lower degree of closed porosity than that of other products sintered under similar temperature and pressure conditions. Upon firing, reactively sintered products exhibit substantially no shrinkage.

In the bonding matrix:

The crystalline phases, in particular the nitrogen and silicon-containing crystalline phases, have been measured by X-ray diffraction and quantified according to the Rietveld method.

Residual metallic silicon in the sintered hard material is normally measured according to the method known to those skilled in the art and referenced under ANSI B74-151992 (R2000). The term "residual" qualifies a constituent present in the starting feedstock and still present in the sintered product obtained from this starting feedstock.

The bulk or apparent density of a sintered product is understood, within the meaning of the present invention, to mean the ratio equal to the mass of the product divided by the volume that said product occupies. It is conventionally determined by the Archimedes method. Standard ISO 5017 specifies, for example, the conditions for such a measurement. This standard also makes it possible to measure the open porosity within the meaning of the present invention.

A powder is constituted of grains or particles as individual solid substances. Conventionally, the "average particle size or diameter" called "D50" of a powder is the size in microns for which, 50% by volume of the grains or particles have a size of D50 or more and 50% by volume of the grains have a size of strictly less than D50. Such D50 is obtained from the cumulative granulometric distribution curve of the grain sizes of the powder which is applied to the granulometric distribution curve measured typically by using a laser particle sizer according to the ISO 13320-1 standard. The laser particle sizer may be, for example, a Partica LA-950 from Horiba.

Unless otherwise indicated, in the present description, all of the percentages are percentages by weight.

FIGURE:

FIG. 1 is a SEM image from a polished section of the hard material of example n° 2 of instant invention. The grains 1 are surrounded by a bonding matrix 2 comprising a silicon and nitrogen crystalline phase, a TiCN phase and a corundum phase.

Examples

The following examples are given purely by way of illustration and do not limit, under any of the described aspects, the scope of the present invention.

In all of those examples, ceramic tiles in the form of a plate having a 100 mm×100 mm surface have been initially produced by casting a suspension in a plaster mold. The mold was adjusted in order to prepare plates of different thickness, from 8 to 12 mm. The plates were prepared according to the process and the formulations described in table 1 below.

The chemical and physical properties measured on samples of said ceramic tiles have been collected in table 2. Module of rupture (MOR) was measured under 3 points flexure at ambient temperature according to IS:1528 (Part V). Bulk density and open porosity were measured respectively according to IS:1528 (Part XII) and IS:1528 (Part VIII). Al2O3 and TiO2 were measured according to IS IS:12107 standard.

X-ray diffraction with Rietveld method and in particular FactSage™ data basis was employed to determine the crystalline composition and phase distribution.

The areal density of each tile was measured according to the following relation:

$$\rho_a = t \cdot \rho_v$$

Where:
$\rho_a$ is the density in Kg/m²
t is the thickness in mm of the tile,
$\rho_v$ is the bulk density in Kg/dm3, which is dependent on the material.

For each example, a population of 8 tiles having an areal density of 28 Kg/m² (+/−0.5 Kg/m²) was glued on a 200 mm×200 mm×5 mm 7020 T6 aluminium plate. Typically, each tile was placed at a distance of 15 meters from the gun carriage. Shots with 7.62×51 P80 (steel core) ammunition were fired at different impact velocities. From those shots a graph was established giving the level of impact (protection up to complete perforation) versus the impact velocity in order to determine the probability of perforation versus the velocity. The average velocity V50 corresponding to a probability of 50% to be protected was calculated to determine the ballistic performance. The higher V50, the better ballistic performance. A V50 higher than 600 is considered to be a satisfying performance, and a V50 equal or more than 700 corresponds a very good ballistic resistance for such an ammunition and areal density.

Inference:

The ballistic properties of the armor components have been collected in table 2. It is observed in Table 2 that:

Examples 1 and 2 of the present invention have ballistic performance that is better than that of Comparative Example 1.

Example 3 of the present invention shows that, even without addition of silicon, the ballistic performance remains acceptable.

Comparative Examples 2 and 3 show, respectively, that an increased level of $Al_2O_3$ or $TiO_2$ leads to ballistic performance which is poorer and below the expected acceptable level.

Needless to say, the present invention is not limited to the described and represented embodiments given as examples. In particular, combinations of the various described embodiments also fall within the scope of the invention.

The invention is not limited either by the shape or dimensions of the sintered product based on silicon carbide.

TABLE 1

|  | Compar. Ex. 1 | Invention. Ex. 1 | Invention Ex. 2 | Invention Ex. 3 | Compar. Ex. 2 | Compar. Ex. 3 |
|---|---|---|---|---|---|---|
| initial mixture formulation(% by weight) | | | | | | |
| SiC powder 20-200 μm D50 = 100 μm |  | 38.0 | 36.0 | 39.0 | 36.0 | 36.0 |
| SiC powder 10-150 μm D50 = 75 μm | 40.0 |  |  |  |  |  |
| SiC powder 0.1-15 μm D50 = 5 μm |  | 24.0 | 24.0 | 24.0 | 24.0 | 24.0 |
| SiC powder 0.1-5 μm D50 = 2.5 μm | 36.0 |  |  |  |  |  |
| Alumina powder 0.4-10 μm D50 = 2.5 μm | 4.0 | 30.0 | 31.0 | 31.0 | 31.0 | 40.0 |
| TiO2 powder Size 1 to 35 μm |  | 6.0 | 6.0 | 6.0 | 15.0 | 6.0 |
| Si powder 0.5-50 μm D50 = 20 μm | 20.0 | 2.0 | 3.0 | 0.0 | 3.0 | 3.0 |
| Fe2O3 powder 0.1-10 μm D50 = 2.5 μm |  | 0.4 | 0.4 | 0.4 | 0.4 | 0.4 |
| CeO2 powder grade size D50: 2 μm | 1.7 | 0.0 | 0.0 | 0.0 | 0.0 | 0.0 |
| B4C powder 95% < 45 μm D50 = 18 μm |  | 0.0 | 0.0 | 0.0 | 0.0 | 0.0 |
| total minerals % | 101.7 | 100.4 | 100.4 | 100.4 | 109.4 | 109.4 |
| added water % | 12.8 | 12.7 | 12.5 | 13.5 | 14.2 | 14.2 |
| added dispersant | 0.4 | 0.25 | 0.25 | 0.25 | 0.28 | 0.28 |
| Processing after mixing | | | | | | |
| Shaping conditions | Casting in Plaster mould | | | | | |
| Drying (T°/duration) | 110° C./24 h | | | | | |
| Firing (T°/duration/time) | 1420° C./8 h/Nitrogen * except comparative example 1 fired at 1450° C. | | | | | |

TABLE 2

|  | Compar. Ex. 1 | Invention Ex. 1 | Invention Ex. 2 | Invention Ex. 3 | Compar. Ex. 2 | Compar. Ex. 3 |
|---|---|---|---|---|---|---|
| Maximum equivalent diameter of SiC grains (mm) | 0.150 | 0.345 | 0.345 | 0.345 | 0.345 | 0.345 |
| Mean equivalent diameter of SiC grains | 30 μm | 60 μm | 60 μm | 60 μm | 60 μm | 60 μm |

TABLE 2-continued

|  | Compar. Ex. 1 | Invention Ex. 1 | Invention Ex. 2 | Invention Ex. 3 | Compar. Ex. 2 | Compar. Ex. 3 |
|---|---|---|---|---|---|---|
| SiC content measured by XRD analysis % b/w | 75.0 | 49.9 | 45.3 | 48.2 | 43.0 | 42.1 |
| Silicon and nitrogen phase composition and % b/w | SiAlON: 13% SI3N4: 12% | SiAlON: 29.5% Si3N4: 2% | SiAlON: 23.9% Si3N4: 2.4% | SiAlON: 30.2% | SiAlON: 14.8% Si2ON2: 9.3% SI3N4 < 5% | SiAlON: 22.7% Si2ON2 < 5% Si3N4 < 5% |
| Corundum measured by XRD analysis % b/w | — | 14.3 | 24.9 | 18 | 29.7 | 33.4 |
| Other crystalline phase(s) found by XRD % b/w | — | 0.6 (AN) | — | — | — | — |
| TiCxN1-x phase XRD analysis % b/w | — | 3.7 x = 0.3 | 3.5 x = 0.3 | 3.6 x = 0.3 | — | — |
| % residual Si measured by XRD % b/w | — | <0.5 | <0.5 | <0.5 | <0.5 | <0.5 |
| Al2O3 % b/w | 4.8 | 28.7 | 30.0 | 28.9 | 28.2 | 37.6 |
| TiO2 % b/w | <0.5 | 5.5 | 5.5 | 5.8 | 13.0 | 1.2 |
| Al2O3/TiO2 ratio calculated | | 5.2 | 5.5 | 5.0 | 2.2 | 31.3 |
| TiO2/silicon and nitrogen crystalline phase ratio calculated | <0.04 | 0.16 | 0.22 | 0.19 | 1.08 | <0.05 |
| bulk density % | 2.68 | 2.86 | 2.88 | 2.84 | 2.73 | 2.86 |
| open porosity % | — | 11.5 | 11.5 | 12.7 | 14.0 | 12.1 |
| MOR 20° C. (MPa) | 70 | 120 | 140 | — | 90 | 95 |
| Ballistic performance*: | 701 | 705 | 762 | 651 | 450 | 499 |

*Average velocity V50 (m/s) 7.62×51 mm P80 (steel core) ammunition. For density of 28 Kg/m²
SiAlON phase identified: β' SiAlON

We claim:

1. Armor component comprising a ceramic hard material, wherein said ceramic hard material is characterized by:
   a bulk density lower than 3.5 g/cm³, comprising grains of ceramic material having a Vickers hardness higher than 15 GPa, comprising a bonding matrix which binds said grains, wherein:
   said bonding matrix represents between 20 and 80% by weight of said ceramic hard material of the ceramic body,
   said bonding matrix comprising an alumina phase, a crystalline phase comprising silicon and nitrogen and a $TiC_xN_{1-x}$ crystalline phase, wherein x is comprised between 0 and 1.

2. The armor component as claimed in claim 1, wherein the grains comprise or are made of SiC.

3. The armor component as claimed in claim 2 wherein the SiC content in said ceramic hard material is between 30% and 55% by weight.

4. The armor component as claimed in claim 1, wherein $TiC_xN_{1-x}$ crystalline phase represents more than 1% and less than 10% by weight of said ceramic hard material.

5. The armor component as claimed in claim 1, wherein a total content of $TiO_2$ in said ceramic hard material, as measured by X-Ray Fluorescence analysis, is comprised between 0.5 and 12% by weight of said ceramic hard material.

6. The armor component as claimed in claim 1, wherein the phase based on silicon and nitrogen comprises at least one compound chosen from silicon oxynitride $Si_2ON_2$, silicon aluminium oxynitride (SiAlON) and silicon nitride $Si_3N_4$.

7. The armor component as claimed in claim 1, wherein the phase based on silicon and nitrogen comprises Silicon Aluminium Oxynitride (SiAlON) phase.

8. The armor component as claimed in claim 1, wherein the Silicon Aluminium Oxynitride phase content is more than 20% by weight of said ceramic hard material.

9. The armor component as claimed in claim 6, wherein the $Si_2ON_2$ content is less than 10% by weight of said ceramic material.

10. The armor component as claimed in claim 6, wherein $Si_3N_4$ content is less than 5% by weight of said ceramic hard material.

11. The armor component as claimed in claim 1, wherein SiAlON content is more than 15% and less than 40% by weight of said hard material.

12. The armor component as claimed in claim 1, wherein $Al_2O_3$ content, as measured by X-Ray Fluorescence analysis, is higher than 10% and/or less than 40% by weight of said ceramic hard material.

13. The armor component as claimed in claim 1, wherein a content of Corundum phase is more than 10% and/or less than 50% by weight of said ceramic hard material.

14. The armor component as claimed in claim 1, wherein a content CaO or MgO or SrO or BaO or $ZrO_2$ or rare earth oxide of said ceramic hard material is below 0.5% by weight and/or the sum of the all these oxides is less than 2% by weight.

15. The armor component as claimed in claim 1, wherein a mass ratio $Al_2O_3/TiO_2$, wherein $TiO_2$ and $Al_2O_3$ content measured by X-Ray fluorescence, is more than 1 and/or less than 40.

16. The armor component as claimed in claim 1, wherein a mass ratio between $TiO_2$ and the silicon and nitrogen based phases, wherein $TiO_2$ content is measured by X-Ray fluorescence and the content of the silicon and nitrogen based phases is measured by X-Ray diffraction, is more than 0.05 and/or less than 1.

17. The armor component as claimed in claim 1, wherein said component is shaped as a ceramic tile.

18. The armor component as claimed in claim 1, wherein the matrix binding the ceramic grains has a porosity of less than 15%, said porosity being measured according to the formula:

$$\text{porosity}_{binding\ matrix} = \text{porosity}_{material} \times \frac{\text{volume}_{material}}{\text{volume}_{binding\ matrix}}$$

the porosity of the material being calculated according to the ratio, expressed as a percentage, of the bulk density measured according to ISO 18754 to the absolute density measured according to ISO 5018.

19. The armor component as claimed in claim 1, wherein the matrix binding the ceramic grains has a Vickers hardness, measured according to ASTM C1327, of greater than 7 GPa on the basis of an indentation imprint of greater than 10 μm.

20. The armor component as claimed in claim 1, wherein the binding matrix does not have any individual hardness measurement of less than 6 GPa.

21. A method for manufacturing of the ceramic hard material of claim 1, the method comprising:
 a) preparing a powdered batch of an admixture comprising:
  an α-silicon carbide mixture at 50 to 80% by weight of said admixture having at least two mean grain sizes of:
   i) 0.1 to 15 micrometers, and
   ii) 20 to 200 micrometers,
  a powder comprising metallic silicon at 0 to 8% by weight of said admixture;
  an α-alumina powder having an average particle size below 50 micrometers at 20 to 40% by weight of said admixture;
  a titanium oxide powder having an average particle size below 100 micrometers at 0.5 to 10% by weight of said admixture;
 b) mixing the powdered batch with a solvent and optionally shaping additives, and shape to obtain a body having a green density of at least 2.5 after drying;
 c) drying and reactive sintering the body under a nitrogenous atmosphere to form a ceramic tile.

\* \* \* \* \*